June 2, 1964 N. B. NICHOLS 3,135,872

EXTREMUM CONTROL SYSTEMS AND EXTREMUM SELECTORS THEREFOR

Filed July 21, 1961 2 Sheets-Sheet 1

INVENTOR.
Nathaniel B. Nichols
BY
P. J. Young, Jr.

June 2, 1964 N. B. NICHOLS 3,135,872

EXTREMUM CONTROL SYSTEMS AND EXTREMUM SELECTORS THEREFOR

Filed July 21, 1961 2 Sheets-Sheet 2

INVENTOR.
Nathaniel B. Nichols

BY P. J. Young, Jr.

United States Patent Office 3,135,872
Patented June 2, 1964

3,135,872
EXTREMUM CONTROL SYSTEMS AND EXTREMUM SELECTORS THEREFOR

Nathaniel B. Nichols, Rochester, N.Y., assignor to Taylor Instrument Companies, Rochester, N.Y., a corporation of New York
Filed July 21, 1961, Ser. No. 126,814
11 Claims. (Cl. 307—80)

This invention relates to extremum selectors. In the art of process control, process monitoring, and the like, such selectors are used for separating, from a plurality of signals, that one having the extreme magnitude, i.e., the greater or greatest, or lesser or least magnitude. The purpose of this is to provide an extremum signal for utilization by itself and in accordance with some useful information represented by the magnitude of said extremum signal. There is a great variety of existing systems in which occur and/or in which there may be caused to occur information-representing signals that are transferred here and there in such a system, and in which it is the practice to separate, on an extremum basis, one signal from its fellows.

The context of the present invention is the art of so-called "process" control, and it is conducive to brevity and clarity to illustrate this invention in specific terms of a particular process. However, as the foregoing brief and general remarks suggest, it is evident that my invention transcends in utility, the particular application thereof set forth herein below for the purpose of exemplifying my invention.

The object of my invention is to provide extremum selectors that may be said to consist of solid state devices, i.e., that class of electrical elements including transistors and diodes.

A novel extremum selector, according to the invention, may be said to consist of solid state circuit means responsive to a plurality of electrical signals in the form of direct currents, and having a portion thereof at which appears, or wherein there flows, a direct current that is or represents that one of said direct currents having the extreme magnitude.

In one case, the novel extremum selector may be said to consist of a transistor and a diode arranged so as to select the lesser of two direct currents applied thereto.

In another case, the novel extremum selector may be said to consist of a pair of diodes arranged so as to select the greater of two direct currents applied thereto.

In still other cases, extremum selectors of either of the above-described types may be cascaded in arrangements having the property of selecting the greatest, or the least in magnitude of three or more direct currents applied thereto.

Figure 1:
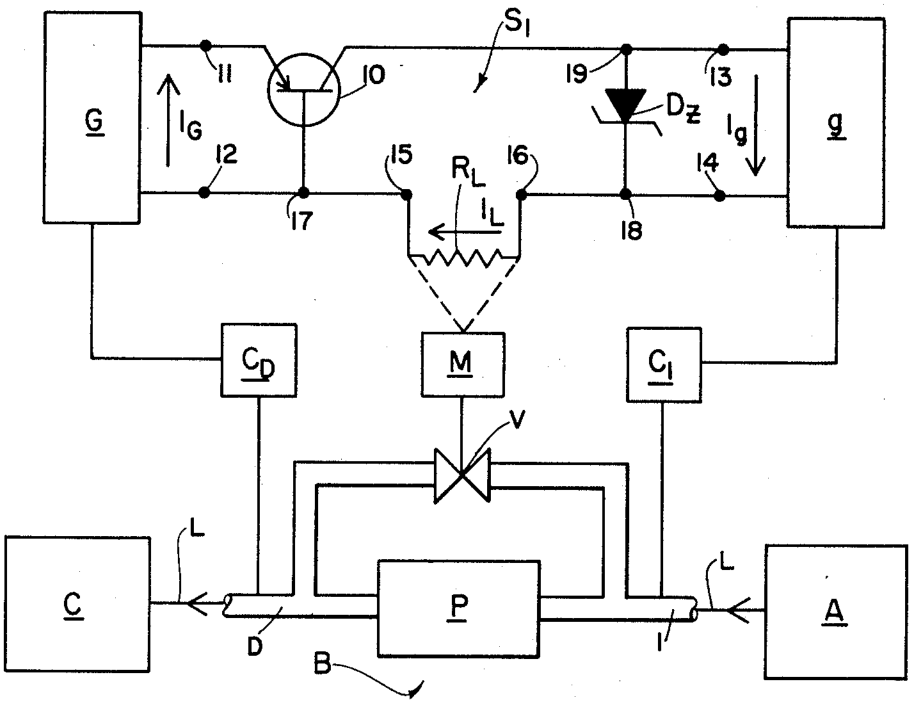
FIGURE 1 illustrates a low or minimum selector according to the invention, and a particular application thereof as well.

In FIGURE 1 is shown a minimum selector $S_1$, in combination with a pipe line system. The pipe line system is represented by a plurality of stations A, B and C interconnected by miles-long lengths of pipe line L. Each said station has the purpose of carrying a throughput of oil and, for purposes of illustration, station A is to be thought of as receiving oil from some source (not shown) and pumping it to station B. Station B pumps oil on to station C and the latter discharges it to some receiver (not shown), where it is stored, consumed or otherwise utilized.

Functionally speaking, the essence of each station is, as illustrated in the case of station B, a pump P having an oil intake connection I and a discharge connection D, said connections being linked to the remainder of the system by pipe line sections L.

A major consideration in a pumping system of the type described is to keep the pressure build-up across a pump P from moving out of a pressure band defined by the maximum permissible discharge pressure and the minimum permissible intake pressure. For illustrative purposes, these pressures will be taken to be 1200 p.s.i.g. and 400 p.s.i.g., respectively.

One way of controlling the pressure build-up is to bypass the pump with a valve V and open or close it to the extent that enough fluid is bled around the pump, through the valve, to keep discharge and intake pressures within the pressure band.

Prior art practice is to provide a motor M for opening and closing the valve, and a pair of pressure controllers $C_D$ and $C_I$, arranging these elements such that either controller can control the motor M. Controller $C_D$ senses the oil discharge pressure at connection D and produces a signal the magnitude of which is a function of discharge pressure. Controller $C_I$ performs the same service in the case of the oil intake pressure at connection I.

Finally, signal-selecting means is provided for the purpose of selecting that one of the controller signals, corresponding to that one of the pressures having the more unfavorable value, and applying the selected signal to the motor M such as to cause valve V to open or open more, so as to bleed or increase bleed of fluid around pump P.

As will be understood by those skilled in the art, the pump will be driven by a motor (not shown) and the pipe line system will be so designed that the system will carry a given throughput of oil for a particular set of conditions involving consumption of oil from the line, line friction, hydraulic head, pump characteristics, etc., and will do so without violation of the limits of the pumping pressure band of a given station. However, for one reason or another, conditions may change and require some action to be taken to prevent violation of a pressure limit. In such event, the function of the selector is to connect the appropriate one of controllers $C_D$ and $C_I$ to the valve V, in this case, the controller corresponding to the pressure limit more in danger of violations.

For example, if valve V is under control of controller $C_I$ and station C stops pumping, discharge pressure at station B will rise, and the selector should normally put valve V under control of controller $C_D$, in order to get valve V further open and limit the pressure build-up across the pump P.

In accordance with my invention, I provide a minimum selector having the property of selecting the lesser of two direct currents applied thereto, which requires that the controllers $C_D$ and $C_I$ be designed so as to translate the pumping pressures to direct currents varying as the pressures. For my purposes, each controller may be considered to include a pressure transducer capable of sensing pumping pressure and producing an electrical output representative of pumping pressure, in combination with a so-called electronic controller as, for example, that disclosed in my U.S. Letters Patent No. 3,127,105, issued March 31, 1964, entitled Controller Improvements Including Bumpless Gain Adjustment and Prevention of Reset Windup, and assigned to the assignee of the present invention. The said electronic controller is basically an amplifier having a D.C. output, and would normally be provided with proportional and reset action, for the purposes of the present application.

The actual details of controllers $C_D$ and $C_I$ are immaterial so long as each acts as a current generator producing D.C. in proportion to pumping pressure. This point is brought out in FIGURE 1 by providing a pair of boxes labeled G and *g*, respectively, separately from the controllers $C_D$ and $C_I$, boxes G and *g* representing the current generator or current source aspect of whatever instrumentalities be provided for converting the pressure to D.C., irrespective of whether the said instrumentalities and the corresponding generator or source are actually part of a more or less unitary assembly or not.

As shown, generators G and *g* are connected to selectors by means of terminal pairs 11—12 and 13—14, respectively, to generate their respective currents $I_G$ and $I_g$, say in the range of 0–5 ma. D.C., the sense of said currents being as indicated by arrows in the diagram.

Since selector $S_1$ has the property of selecting the lower current, in effect, and since it is the practice to use a biased-open, increase-signal-to-close valve V, the design of controller $C_D$, will be such that its generator G produces a current $I_G$ inversely proportional to discharge pressure. For example, if the discharge pressure increases from 1100 to 1200 p.s.i.g., $I_G$ may decrease from 5 to 0 ma. D.C.

Controller $C_I$, on the other hand, would then be designed so that its generator would produce a current $I_g$ directly proportional to pressure. Suitably, if intake pressure dropped from 500 to 400 p.s.i.g., $I_g$ may decrease from 5 to 0 ma. D.C.

Since direct current is the immediately-effective control quantity insofar as selector $S_1$ is concerned, the motor of valve V is conveniently of the type that includes an effective load resistance $R_L$, and throttles the bleed through valve V in direct proportion to the magnitude of D.C., if any, flowing through $R_L$.

It is obvious from the foregoing that valve V will always be under the control of the pressure that is nearer its permissible limit. The valve V, of course, would generally be so designed, insofar as possible, that zero ma. D.C. through $R_L$ opens the valve enough to drop the pressure difference across the pump to bring the intake and discharge pressures within the desired pressure band, under the most unfavorable foreseeable circumstances of system function or malfunction. In any event, load current $I_L$ through $R_L$, in the direction indicated in FIGURE 1, would correspond to that pressure which is nearer its limit.

The selector proper (looking at it as a box with appropriate terminals), consists of a transistor 10, a Zener diode $D_Z$, terminal pairs 11 and 12, 13 and 14, and 15 and 16; and the wiring necessary to interconnect terminals, transistor and diode, as shown. Functionally speaking, however, selector $S_1$ also includes, connected to the said terminal pairs, in the order named supra, current source G, current source *g* and load resistance $R_L$.

Selector $S_1$ has the property of causing the load current $I_L$, through $R_L$, to be either the collector current of transistor 10, $I_C$, which is very nearly the current of source G, $I_G$, or the current of source *g*, $I_g$, depending on which of $I_C$ and $I_g$ is the lesser.

Suppose in the selector $S_1$ of FIGURE 1, that $I_G$ and $I_g$, the respective output currents of sources G and *g*, are respectively greater than zero, and zero. This being the case, the only current flowing will be $I_G$, $I_G$ being shunted through the few hundred ohms of emitter-base resistance of the transistor 10, hence, the load current $I_L$, through $R_L$, will be zero.

If, however, the situations of $I_G$ and $I_g$ are reversed, Zener diode $D_Z$ will fire and shunt $I_g$ therethrough, hence, $I_L$ will again be zero. If, now, $I_G$ increases, but remains less than $I_g$, it will find the transistor biased by the Zener voltage of diode $D_Z$ applied to the transistor base via $R_L$. The transistor therefore will generate a collector current $I_c = \alpha I_G$ flowing in the direction of terminal 19. Since source *g* is a current source, and because of the polarity of the diode $D_Z$, the current $\alpha I_G$ will flow to the transistor base through diodes $D_Z$ and $R_L$. Hence, $I_L = \alpha I_G$.

For the above action to take place, the Zener voltage $E_Z$ of the diode $D_Z$ must be greater than the drop across $R_L$ for whatever maximum values of $R_L$ and $L_L$ are contemplated, and diode $D_Z$ must fire when a few microamps reverse current are applied thereto at its Zener voltage. This assures the proper bias on the transistor for amplifying $I_G$ when the value of $I_G$ is between the value of $I_g$ and zero, the reverse current through the diode therefore being the difference between $I_g$ and $\alpha I_G$ at this time.

Suppose, now, that the difference between $I_g$ and $\alpha I_G$ becomes zero, or at least less than the aforesaid few microamps of reverse current. Under this circumstance, diode $D_Z$ stops firing, there being no Zener current and $I_g$ having no way to go now, unless through $R_L$. The transistor loses its bias, which was the Zener voltage, and therefore stops amplifying $I_G$. The collector-to-base junction of the transistor becomes forward-biased and the transistor will conduct from base to collector. Thus, a current path, including $R_L$, is made and, hence, the load current $I_L$ will be $I_g$.

In accordance with my invention, I choose a transistor 10 having an $\alpha$ as nearly equal to unity as is possible, and have found many transistor types having an $\alpha$ such that $1 > \alpha > 0.98$. For all practical purposes, the quantity $\alpha I_G$ then can be taken to be the same as $I_G$.

It will therefore be seen that the selector $S_1$ provides a means for selecting, in effect, the lesser of two direct currents, $I_G$ and $I_g$, simply and accurately, when those currents are applied to the appropriate terminals of the selector $S_1$, and a suitable load resistance $R_L$ is provided for the selector.

It is to be understood, of course, that the above-described selector circuit operation depends on to what extent sources G and *g* approximate current sources. Since the loading of source G is transistor 10, and that of source *g* is predominantly $R_L$, one proceeds in the selector design with some maximum value of $R_L$ in mind and some amplifier or other source capable of handling $R_L$ on a current basis. From this point, one chooses a Zener diode having a suitable Zener characteristic and a transistor having a high D.C. forward current transfer ratio (to assure $\alpha = 1$), a collector-base voltage=

$$(E_Z - I_L R_L) > 0$$

and, to minimize temperature dependence, a low collector reverse current.

Transistor 10, of course, must act like a current source with respect to $R_L$ when $I_L$ is $\alpha I_G$, and have low input resistance with respect to source G. These characteristics, however, are more or less inherent in transistors in general, at least in the absence of feedback.

Normally, $R_L$, G and *g*, respectively, will be physical as well as functional elements of a valve-positioner (i.e., so-called motor M), controller $C_D$ and controller $C_I$, in that order. $S_1$ will be, in effect, a box having terminals 11 to 16, the polarities of which, with respect to the sense of currents $I_G$, $I_g$ and $I_L$, will depend on the contents of the box. In this instance, polarity is determined by transistor 10, shown to be PNP as to type of semi-conductor material and having its P-type collector electrode connected to the P-type electrode (i.e., the anode) of $D_Z$. Transistor 10, however, can be replaced by an NPN transistor. Since it is found, in practice, that there are NPN transistors equivalent to PNP types, in respect of the conditions laid down herein as to transistor 10, an NPN transistor can be directly substituted for PNP transistor 10. The effect of such substitution is merely an inversion of the polarity scheme shown in FIGURE 1 in terms of current arrows and solid state device symbols.

Physically speaking therefore, use of an NPN transistor requires directly substituting the NPN element for the PNP element, reversing the connections of $D_Z$ to junctions 18 and 19, reversing the connections of $R_L$ to terminals 15 and 16, reversing the connections of $g$ to terminals 12 and 14, and reversing the connections of G to terminals 11 and 12.

It is also obvious that the pressure-representing signals could be selected on a maximum or high basis, with respect to the pressures. In this event, it would be necessary to reverse the sense of the proportioning characteristics of motor M or valve V, and of controllers $C_D$ and $C_I$. Namely, controller $C_D$ would be designed so that its generator G would produce $I_G$ in direct proportion to discharge pressure; controller $C_I$ would be designed so that $I_g$ was inversely proportional to intake pressure. Valve V may be as before, in which case motor M would have to be designed to open valve V with increasing $I_L$.

I have also discovered a form of maximum current selector in which the active elements of the selector proper also consist of solid state devices, namely, a pair of diodes. However, like the selector $S_1$, maximum selector $S_2$ also requires a pair of current sources G and $g$, and a load resistance $R_L$ as functional parts thereof.

Figure 2:
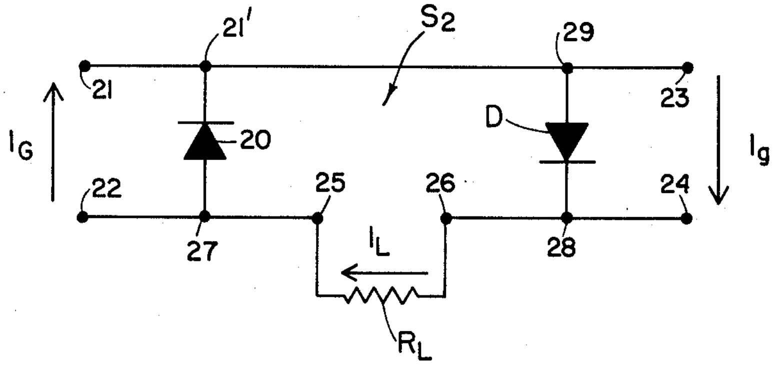
FIGURE 2 illustrates a high or maximum selector according to the invention.

Referring now to FIGURE 2, the reference numerals 20 to 29, inclusive, denote the junctions, terminals and circuit elements that correspond respectively to the entities denoted by reference numerals 10 to 19, inclusive, in FIGURE 1. However, instead of a transistor, the maximum selector $S_2$ of FIGURE 2 has an ordinary diode 20, one electrode (the cathode) of which is connected to junction 21', electrically equivalent to terminal 21 (and, of course, to junction 29, and to terminal 23), and the other electrode (the anode) thereof to terminal 27, which corresponds to the transistor base of the minimum selectors of FIGURES 1 and 2. In addition, another ordinary diode D is connected between junctions 28 and 29, where the minimum selector has the Zener diode $D_Z$, the anode of diode D being connected, in effect, to the cathode of diode 20.

Supposing that current sources G and $g$ (not shown in FIGURE 3), at the terminal pairs 21 and 22, and 23 and 24, would generate currents $I_G$ and $I_g$ having the directional sense corresponding to the arrows adjacent the terminals of the said pairs, by inspection it is obvious that there is a conductive path including $R_L$ for each such current source. Hence, if a source G, generating current $I_G$, be connected to terminals 21 and 22, and a source $g$, generating current $I_g$, be connected to terminals 23 and 24, it will follow that the load current $I_L$, through $R_L$, will be the larger of $I_G$ and $I_g$.

Supposing that $I_G > I_g$, then a net current of $I_G - I_g$ must flow through diode D from junction 29 to junction 28. In this condition, however, diode D appears to be a short circuit (at least in comparison to $R_L$) to the generator of $I_g$. Under these circumstances, diode 20 looks like an open circuit (at least in comparison to diode D) to the generator of $I_G$. Therefore, since $R_L$ is in the only complete conductive path across terminals 21 and 22, the load current $I_L$ is necessarily $I_G$.

Conversely, if $I_G < I_g$, the above circumstances are reversed, i.e., a net current of $I_g - I_G$ flows through diode 20, diode 20 is a short circuit with respect to $I_G$, diode D is an open circuit with respect to $I_g$, $R_L$ is in the only complete conductive path connected across terminals 23 and 24, and the load current $I_L$ is necessarily $I_g$.

In practice, of course, the generators of $I_G$ and $I_g$ and the diodes D and 40 are real elements subject to certain limitations. The requirements, however, are not very stringent, since the selector operates as explained, provided that the source resistances of $I_G$ and $I_g$ are large enough with respect to $R_L$ that the latter has no appreciable loading effect on the current sources.

As for diodes D and 20, they should be rated to withstand peak inverse voltages larger than the highest that would normally occur in the circuit. Given the load resistance and the highest load current that can occur, the diodes would be chosen to have voltage breakdown (i.e., PIV) ratings greater than the product of load resistance and the highest load current. The diodes are desirably selected to have low leakage current also, since reverse current leakage degrades the accuracy with which $I_L$ equals the larger of $I_G$ and $I_g$.

While diodes D and 20 have been specified to be "ordinary" diodes, they may be Zener diodes whose breakdown (i.e., Zener) voltage ratings correspond to the PIV ratings selected in case ordinary diodes be used. While Zener diodes are more costly than ordinary diodes, the regulating characteristic of the Zener diode would be useful under certain circumstances. Supposing one or both of sources G and $g$ be capable of producing a current greater than desired, the corresponding diode or diodes could be selected to have a Zener voltage equal to the highest reverse-bias that could occur thereon with the allowable maximum load current flowing through $R_L$. For example, were operation to be on the 1 to 5 ma. D.C. basis of the low current selector example, and the current source across diode 20 could, on occasion, produce a higher current, then diode 20 could be a Zener diode having a Zener voltage equal to the product of $(5\times10^{-3})(R_L+R_F)$, where the right-hand parentheses are the sum of $R_L$ in ohms and the forward resistance, in ohms, of diode D.

As in the case of low current selector $S_1$, high current selector $S_2$ is a high selector or a low selector, with respect to the variables represented by $I_G$ and $I_g$, depending on the sense of the proportionality between the currents $I_G$ and $I_g$, on the one hand, and said variables, on the other hand.

It will be evident from the foregoing that my novel extremum selectors are remarkably simple and economical, both as to manufacture and as to use. In any extremum-type control system of the type shown in FIGURE 1, the controller and valve elements are given, hence, if they are of the direct current-using type, selector action is obtained easily and reliably merely by the addition of a pair of inexpensive, long-life, solid-state devices.

In the prior art, one finds fluid pressure selectors, voltage selectors, current selectors and so on, all of which, like my novel selectors, have the function of selecting the extreme ones of pluralities of pressures, voltages, currents and so on. Unlike my novel current selectors, all these prior art selectors, insofar as I am aware, are complicated by such inconveniences as needing operating power distinct from the signals operated upon, and/or requiring relays and moving parts of one sort and another, and so on. Selectors according to my invention, however, have no moving parts and use very little of the signal power of the current sources interconnected by the selectors.

Exploring the possibilities of low current selector $S_1$ a little further, it will be seen that $I_G$ and $I_g$ can be monitored continuously. For example, if a resistor much smaller than $R_L$ were used to connect junction 18 to terminal 14, the drop across such resistor could be measured as an index of the magnitude of $I_g$, yet the loading effect of such resistor would be practically nil. Obviously, the connection between junction 13 and terminal 19 could be made in the same way to the same end. Again, $I_G$ could be monitored in the same fashion by connecting the emitter or the base of transistor 10 to, respectively, terminal 11 or 12, via such a resistor. In the same fashion, the selected current, i.e., $I_L$, could be monitored anywhere in the loop containing $R_L$, $D_Z$ and transistor 10. Also, such practices are obviously feasible with high current selector $S_2$.

Since my novel current selectors depend solely on the currents, from which a selection is made, for bias and power; and since they are low-resistance loads with respect to the generators of said currents, it is possible to cascade selectors in large numbers without deteriorating current-source behavior of the real devices which are supposed to generate the currents to be selected from as if from sources of high but finite internal resistance.

Figure 3:
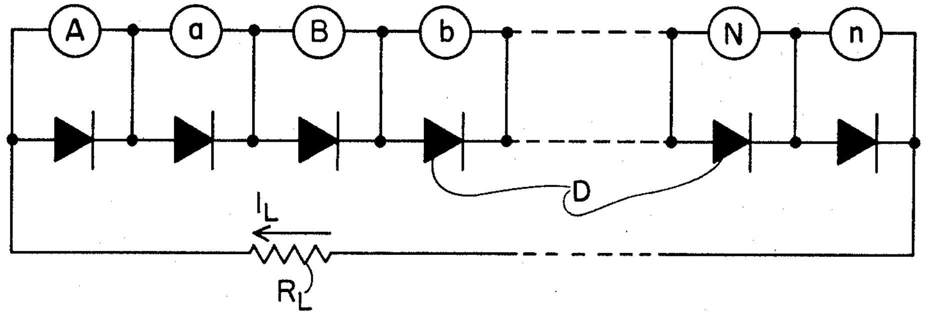
FIGURE 3 illustrates $n$ high or maximum selectors cascaded for selecting the greatest of $n$ currents.

In FIGURE 3, what amounts to $n$ high selectors, of the construction shown in FIGURE 2, are shown in cascade for selecting the greatest of $2n$ direct currents finished by sources, A, $a$, B, $b$ . . . N, $n$. Starting with sources A and $a$, these and each succeeding, next-adjacent pair of sources, each such pair, in conjunction with a corresponding pair of diodes D, corresponds to one high selector. With the currents $I_A$, $I_a$ et al. directed as shown in FIGURE 3, the load current $I_L$, through the sole load resistance $R_L$, will be the greatest one of currents $I_A$, $I_a$ et al.

It will be noted that in the illustrated cascade, the path of the selected current will include $R_L$ plus the other low-resistance paths in the various solid state devices. Hence, the number of selectors in a cascade depends on how much loading the selected source can stand over and above a given load resistance $R_L$.

Since the resistance, apart from $R_L$, seen by any current source, is solely very low diode-type resistance, a cascade of hundreds of selectors would not add more than a few hundred ohms to the effective load seen by the current source seeing $R_L$. An $R_L$ of 6,000 ohms being a typical load in practical cases, it is obvious that the resistive loading effect due to cascading selectors, can be ignored except in unusually extreme cases.

Figure 4:
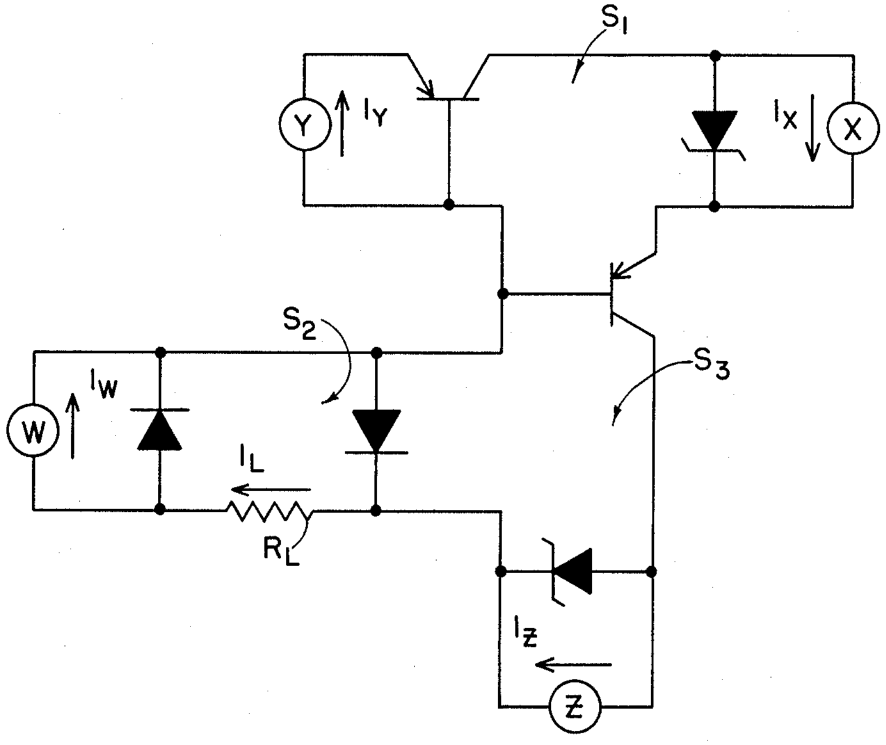
FIGURE 4 illustrates another mode of cascading low and/or high selectors, respectively.

FIGURE 4 illustrates still other types of selector cascading. In this case, the low selector $S_1$ acts as one current source for another low selector $S_3$, and the latter in turn acts as one current source for the high selector $S_2$, there being, therefore, only four external current sources W, X, Y and Z. Assuming that $I_W$, $I_X$, $I_Y$ and $I_Z$ are directed as shown, it is obvious by inspection that the load current $I_L$, through load resistance $R_L$, will be the greater one of two currents, namely, $I_W$ and the least of $I_X$, $I_Y$ and $I_Z$.

Selector $S_1$ and source Z could be interchanged, without affecting the operation of the cascade as shown. That is, the Zener diode of $S_1$ would have its cathode connected to the cathode of the Zener diode of $S_3$, the transistor of $S_1$ would have its base connected to the anode of the Zener diode of $S_3$, and the source Z would be connected across base and emitter of the transistor of $S_3$ so that $I_Z$ would flow through the said transistor of $S_3$ from emitter to base.

As is evident from FIGURE 4, the variety and number of selector configurations, derivable on the basis of connecting one input of selector whether high or low, to the output of another selector, whether high or low, is too great to enumerate. The guiding principle is, however, that of cascading by replacing a source current of one selector with a load current of another selector, the arrangement being that the latter current has the same sense as the former would require if it were to be used by itself as a selector of the more extreme of two source currents. As in the case of FIGURE 3, large numbers of selectors, low as well as high, may be cascaded, since, again, only diode-type forward resistance is added to the single load resistance $R_L$. In low current selectors, the sources on the transistor sides of the selectors never actually see the cascaded load, this load being seen by a transistor in the event that the source corresponding to the said transistor is, in effect, providing the load current $I_L$, i.e., load current is the collector current of the said transistor. On the other hand, the transistor would conduct like a diode from base to emitter when not generating a collector current, as in the FIGURE 1 case when $I_g < I_G$.

The cascading property is particularly useful in monitoring a large number of conditions such as pressure, temperature, and so on. For example, given some apparatus or environment wherein various temperatures reign at various locations therein, it is often of interest to know the most extreme (either the least, or the greatest), temperature, and it is the practice to provide a scanning and measuring instrument that examines each temperature and has the property of selecting the most extreme temperature, and presenting it as a scale indication, a control signal or a recorded point on a record chart.

The only conditions that need be put on the nature of the conditions is that each be convertible into a direct current. Thus, one may provide that the range of interest of each condition corresponds to a range of 0 to 5 ma., and that it is necessary to determine whenever one condition value increases or decreases to a value such as to be converted into the least current of all of the currents applied to the cascade. In this case, $R_L$ would represent the input resistance of a suitable measuring or indicating device, or of a controller, or of the total input resistance of several such instrumentalities in series, and so on.

Since the D.C. inputs to a selector or selector cascade, could be inverse functions of pressure, temperature, voltage, or even some other current (D.C. or A.C.), the selector or selector cascade is a minimum or a maximum selector depending respectively on whether the actual current selected is a direct function of the variable of interest (including itself) or is an indirect function of the variable of interest (other than itself). For example, the system of FIGURE 1 represents a hybrid case, since one current is an inverse function of pressure and the other is a direct function of pressure.

Again, the cascade shown in FIGURE 4 is not, strictly speaking, a high, low or extremum selector, relative to the currents $I_W$, $I_X$, $I_Y$ and $I_Z$.

In view of the foregoing, which shows that the terms low, high, extreme, and so on, are relative and depend on the immediate contexts of their use, my usage of such terms in this description is of no restrictive import as to the disclosure taken as a whole. Again, the term "proportional," it is to be noted, is used in the broad sense in the claims infra. No restriction to type, sense or law of proportionality is intended.

It will be evident from the foregoing that I have invented most reliable, simple, and versatile forms of current selectors. Though these selectors lend themselves readily to quite complex schemes of selector cascade, the individual selector properties can be expected to be little affected, within wide limits, by unwanted interactions such as often arise in practice when one attempts to interconnect circuits having unitary functions, as if they were "black boxes." For example, I have found that a cascade of five low selectors does not behave detectibly different from one low selector, beyond the fact that the cascade selects, perforce, from more than two direct currents.

I believe that the foregoing disclosure is sufficient unto one skilled in the art to enable him to make and use my invention, and I have herein described my invention in the best form known to me thus far.

Having therefore complied to the fullest with the requirements of the statutes, I claim:

1. In combination, a first semi-conductor device and a first direct current source, said first semi-conductor device having electrodes, and said first current source being directly connected between certain of said electrodes such that a direct current effectively that of said first current source would flow between a pair of said electrodes were said pair of said electrodes connected together by a conductive load; a second semi-conductor device and a second direct current source, said second semi-conductor device having electrodes and said second current source being directly connected between certain of said electrodes of said second semi-conductor device such that a direct current effectively that of said second current source would flow between a pair of said electrodes of said second semi-conductor device, were the said pair of said electrodes of said second semi-conductor device connected together by a conductive load, first means conductively connecting together one of the first said pair of said electrodes and one of the said pair of said electrodes of said second semi-conductor device, second means conductively connecting together the other of said first said pair of electrodes and the other of said pair of said electrodes of said second semi-conductor device; and a load resistance included in one of said first and second means so as to be traversed by current flow, if any, between the electrodes connected together by one of said first and second means, and said direct current sources having a polarity, with respect to current flow direction, that current flow, if any, through said load resistance, will be in the same direction at all times, irrespective of whether one said direct current source or the other said direct current source causes current to flow through said load resistance.

2. The invention of claim 1, wherein one said semi-conductor device is a Zener diode, and the other said semi-conductor device is a transistor, one said pair of said electrodes being the collector and the base of said transistor.

3. The invention of claim 1, wherein each said semi-conductor device is a diode.

4. In combination, a first current source, said first source being constructed and arranged to produce a first direct current and to produce its said current in proportion to the magnitude of a first variable condition; a second current source, said second source being constructed and arranged to produce a second direct current and to produce its said current in proportion to the magnitude of a second variable condition; control means, said control means being constructed and arranged to produce a control effect in proportion to the magnitude of a third direct current applied thereto, said control means having a resistance through which such third direct current must flow in order that said control effect be produced as aforesaid herein; a transistor having a base, an emitter and a collector, said transistor being connected to said first source via said base and said emitter, the arrangement being such that if said base be properly biased, collector current nearly equal to the current of said first source could be obtained between said base and said collector; said resistance having one end thereof connected to said base; a Zener diode having an anode and cathode, that one of said anode and said cathode that is like as to type of semi-conductor material to said collector being connected to said collector, and the other of said anode and said cathode being connected to the other end of said resistance; said second source being connected to said anode and said cathode such that its said current reverse-biases said diode; said diode having a Zener voltage greater than the product of said resistance and the maximum expected value of said third direct current, whereby if said first direct current is larger than said second direct current, said third direct current will be said second direct current, whereas if said first direct current is lesser than said second direct current, said third direct current will be very nearly said first direct current, the ultimate effect being that said control effect will be produced substantially in proportion to the lesser of said first direct current and said second direct current.

5. The invention of claim 4, wherein said transistor is PNP, the said anode of said diode is connected to the said collector of said transistor, and the said first source is connected to said transistor so that the flow-sense of the said current of said first source is through said transistor from said emitter to said base.

6. The invention of claim 4, wherein said transistor in terms of semi-conductor material type is NPN, the said cathode of said diode is connected to the said collector of said transistor, and the said first source is connected to said transistor so that the flow-sense of the said current of said first source is through said transistor from said base to said emitter.

7. A circuit assembly for use as an extremum selector, said assembly being, in combination, a transistor having an emitter, a collector and a base, said transistor having an $\alpha$ substantially equal to 1; a Zener diode, said Zener diode having an anode and a cathode; said transistor having its said collector conductively connected to that one of said anode and said cathode which is of the same type of semi-conductor material as said collector; said assembly also including a pair of load terminals, a first pair of input terminals and a second pair of input terminals; one of said pair of load terminals, one of said first pair of input terminals and said base being conductively connected together; the other of said pair of load terminals, one of said second pair of input terminals and the other of said anode and said cathode being conductively connected together; the other of said first pair of input terminals being conductively connected to said emitter; and the other of said second pair of input terminals being conductively connected to said collector and to said one of said cathode and said anode.

8. The invention of claim 7, wherein said transistor is PNP as to type of semi-conductor material, said transistor having its said collector conductively connected to said anode of said diode.

9. The invention of claim 7, wherein said transistor is NPN as to type of semi-conductor material, said transistor having its collector conductively connected to said cathode of said diode.

10. In combination, a first source of direct current variable in magnitude, a second source of direct current variable in magnitude, a load resistance, a first diode and a second diode; said first source being connected to said first diode so that the said current of said first source has a flow-sense capable of reverse-biasing said first diode; said second source being connected to said second diode so that the said current of said second source has a flow sense capable of reverse-biasing said second diode; said diodes each having an anode and a cathode, the cathode of one said diode having a conductive connection to the anode of the other said diode, and the anode of said one said diode having a conductive connection to the cathode of said other said diode, one of said conductive connections being essentially said load resistance; each said diode having a breakdown voltage rating high enough that neither diode will break down under voltage drops that may be desired and expected to occur across the net load seen by either current source; whereby said load resistance will carry a direct current that is the greater of the said direct currents of said sources.

11. A circuit assembly for use as an extremum selector, said assembly including, in combination, a pair of load terminals, a first pair of input terminals, a second pair of input terminals, and a pair of diodes, each of said pair of diodes having an anode and a cathode; means conductively interconnecting one of said pair of load terminals, one of said first pair of input terminals and one of said anode and said cathode of one of said pair of diodes; means conductively interconnecting the other of said first pair of input terminals, and the other of said anode and said cathode of said one of said pair of diodes; the said anode and said cathode of the other of said pair of diodes, the said second pair of input terminals and the other of said load terminals being conductively interconnected exactly as in the case of said first pair of input terminals, said one of said load terminals, and said one of said pair of diodes, save that said other of said pair of said diodes has its said anode conductively interconnected with respect to the various said terminals as does the said cathode of said one of said pair of diodes, and the said cathode of said other of said pair of diodes is conductively interconnected with respect to the various terminals as is the said anode of the said one of said pair of diodes; and means conductively interconnecting the said cathode of one of said pair of said diodes with the anode of the other of said pair of diodes, the remaining said cathode and the remaining said anode being that anode and that cathode respectively conductively interconnected with each of said pair of load terminals.

References Cited in the file of this patent

UNITED STATES PATENTS 2,482,588 LeTourneau ---------- Sept. 20, 1949

2,883,608 Smith ---------------- Apr. 21, 1954